US006389532B1

(12) United States Patent
Gupta et al.

(10) Patent No.: US 6,389,532 B1
(45) Date of Patent: May 14, 2002

(54) METHOD AND APPARATUS FOR USING DIGITAL SIGNATURES TO FILTER PACKETS IN A NETWORK

(75) Inventors: Amit Gupta, Palo Alto, CA (US); Radia J. Perlman, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/063,630

(22) Filed: Apr. 20, 1998

(51) Int. Cl.$^7$ ................................................ G06F 1/24
(52) U.S. Cl. .............................. 713/60; 713/53; 713/76
(58) Field of Search ................................ 713/160, 153, 713/176

(56) References Cited

U.S. PATENT DOCUMENTS

| | | | | |
|---|---|---|---|---|
| 5,175,765 A | * | 12/1992 | Perlman | 380/30 |
| 5,268,962 A | * | 12/1993 | Abadi et al. | 380/21 |
| 5,455,865 A | * | 10/1995 | Perlman | 380/49 |
| 5,511,122 A | * | 4/1996 | Atkinson | 380/23 |
| 5,850,449 A | * | 12/1998 | McManis | 380/25 |

FOREIGN PATENT DOCUMENTS

| | | | | |
|---|---|---|---|---|
| EP | 0464563 | 1/1992 | ............ | H04I/29/06 |
| WO | WO9613113 | 5/1996 | ............ | H04L/29/06 |
| WO | WO9700471 | 1/1997 | | |

OTHER PUBLICATIONS

Microsoft Press Computer Dictionary, Microsoft Press, 1997, pp. 64 and 318.*

Comer, Internetworking with TCP/IP, 1995, pp. 130 and 479.*

D. Katz, RFC 2113 entitled "IP Router Alert Option", published Feb. 1997.

Douglas E. Comer, Chapter 17, entitled "Multicast Addressing (IGMP)" in Book entitled "Internetworking with TCP/IP vol. 1 Principles, Protocols, and Architecture" $2^{nd}$ Edition, published by Prentice Hall, 1991, pp. 281–290.

Bruce Schneier, Chapter 18, entitled "One–Way Hash Functions" in Book entitled *Applied Cryptography*, $2^{nd}$ Edition, published by John Wiley & Sons, Inc., 1996, pp. 436–441.

Bruce Schneier, Chapter 19, entitled "Public–Key Algorithms", in Book entitled *Applied Cryptography* $2^{nd}$ Edition, published by John Wiley & Sons, Inc., 1996, pp. 466–474.

U.S. application No. 08/885,817, Gupta et al., filed Jun. 30, 1997.

Smith, B. R. et al, "Securing The Border Gateway Routing Protocol", Communications: The Key To Global Prosperity, Globecom, 1996, Global Internet '96 Conference Record, London, Nov. 18–22, 1996, vol. Supp. Nov. 18, 1996, Institute of Electrical and Electronics Engineers, pp. 81–85.

* cited by examiner

Primary Examiner—Thomas R. Peeso
(74) Attorney, Agent, or Firm—Squire, Sanders & Dempsey, L.L.P.

(57) ABSTRACT

A method and apparatus for filtering packets uses digital signatures to filter packets in a network. A filter point, such as a router or firewall to an intranet, receives a packet including a header, detects the existence of a signature in the header, tests the validity of the signature using a public key, and forwards the packet in accordance with the validity of the signature. A sender uses a private key obtained from an owner to generate the signature, which is created by encrypting a fingerprint which corresponds to the data in the packet. Public keys are created by an owner which installs them in a domain name system or a certification server. Private keys are also created by the owner but are disseminated only to authorized senders. A method and apparatus for sending packets stores a private key in a memory of the data processor, generates a signature using the private key, installs the signature into a header of a packet; and sends the packet.

41 Claims, 8 Drawing Sheets

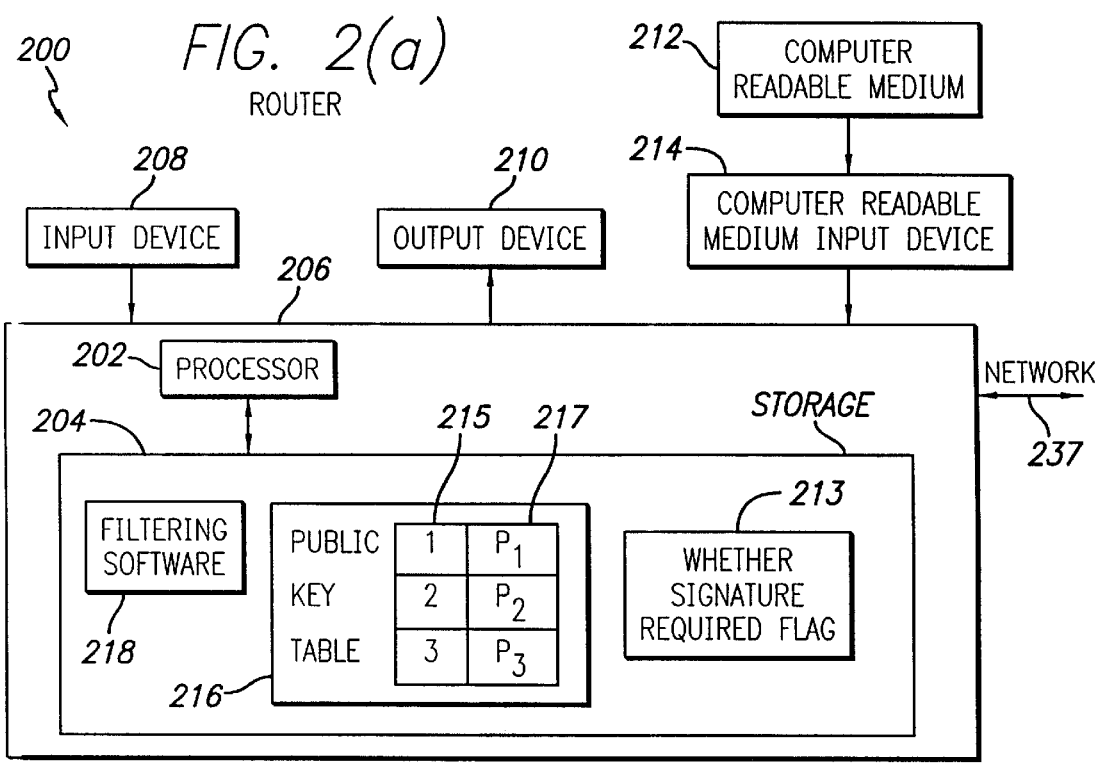

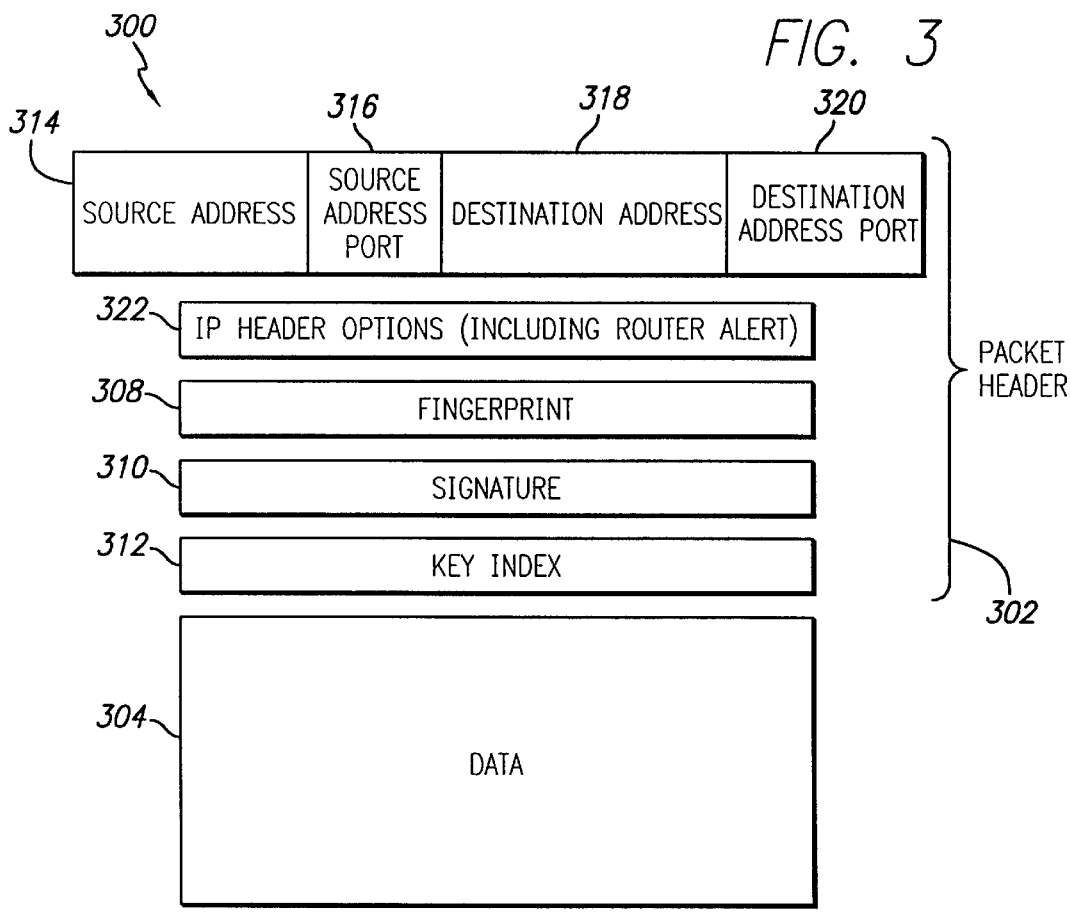
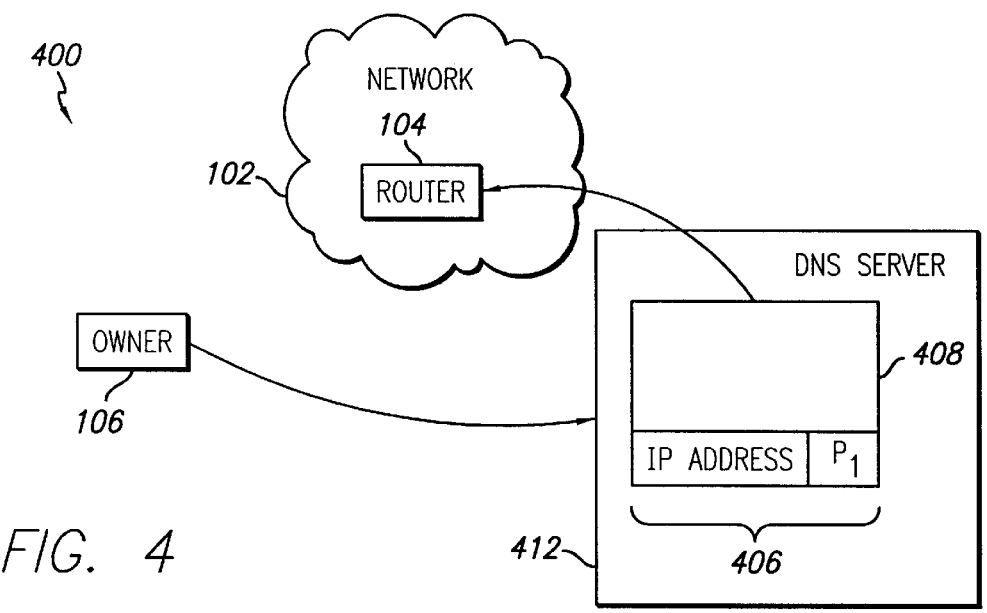

OWNER DISTRIBUTES KEYS

SENDER SENDS A MULTICAST PACKET.

ROUTING A PACKET.

FILTER PACKETS EXCEEDING A ROUTER LIMIT

METHOD AND APPARATUS FOR USING DIGITAL SIGNATURES TO FILTER PACKETS IN A NETWORK

RELATED APPLICATIONS

The following co-pending patent application is related to the subject application and is herein incorporated by reference:

application Ser. No. 08/885,817, entitled, "Techniques for Securing Data Flow in Internet Multicasting", filed on Jun. 30, 1997, of Amit Gupta and Paul Jardetzky.

FIELD OF THE INVENTION

The present invention relates generally to network communications. More specifically, the present invention is a method and apparatus for using digital signatures to filter packets in a network.

BACKGROUND OF THE INVENTION

Internet protocol (IP) Multicasting is a form of network communication in which a single message is sent to multiple destinations at once. A multicast group owner sets up a multicast group address. Senders and receivers may join the group by accessing the group address.

One problem with IP multicast is that it allows unauthorized senders to transmit to the multicast group, requiring the end host system to keep state and to process packets which are not authorized to be sent to the group. The packets are transmitted by the unauthorized sender and forwarded by routers to the end host. Routers are systems which can be used to forward packets between networks.

One solution to this problem is for the group owner to encrypt the session and require authorized members to obtain a group key in order to decrypt the data. However, this mechanism does not prevent denial of service attacks where unauthorized senders from a network on one side of a router or a firewall transmit numerous IP messages to an end host in a network on the other side of the router or firewall. The router or firewall passes the packets from the network where the sender is located to the network where the end host is located, without processing the packets. The end host receives and processes each packet to determine whether the sender may join the encrypted session. If the sender is not authorized to join the session, the end host denies service to that sender. A malicious user, in what is called a denial of service attack, may send numerous unauthorized messages to an end host system on the other side of a router or a firewall. Even though the malicious user is not authorized to access the system, it can cause a network bottleneck because the end host at the other side of the router or firewall must process all of the incoming messages to determine whether the sender may join the encrypted session, thereby using up network bandwidth and resources.

SUMMARY OF THE INVENTION

Consistent with the present invention, a method and apparatus for using digital signatures filters packets in a network in order to avoid wasting router bandwidth and resources on processing packets associated with unauthorized senders.

An embodiment consistent with the present invention includes a method and apparatus for filtering packets, performed by a data processing system, which comprises the steps of receiving a packet including a header; detecting the existence of a signature in the header, and forwarding the packet in accordance with the validity of the signature. The data processing system that performs these steps may be, for example, a router or a firewall. An embodiment consistent with the present invention may be implemented as a computer program product or as a computer data signal embodied in a carrier wave. An embodiment consistent with the present invention also includes a method and apparatus for sending packets, performed by a data processing system, which comprises the steps of storing a private key in a memory of the data processor, generating a signature using the private key, installing the signature into a header of a packet, and sending the packet. An embodiment consistent with the present invention may be implemented as a computer program product or as a computer data signal embodied in a carrier wave.

An owner disseminates private keys to the senders. When there are numerous keys, the keys may be stored in indexed tables. A sender signs the packet using the one of the private keys. A router or a firewall then determines the validity of the signature by checking the signature using the public key. If the signature is valid, the router or firewall forwards the packet. Packets having an invalid signature are discarded.

The method for signing the packet may include creating a fingerprint corresponding to the data and encrypting the fingerprint using a private key to yield a signature. The method for checking the signature may include decrypting the fingerprint using a public key and comparing the decrypted fingerprint to a newly created fingerprint of the data.

An embodiment consistent with the present invention also includes a method for filtering packets, performed by a data processing system, which comprises the steps of receiving a plurality of packets, each of which includes a header, determining a number of packets received from a particular source, detecting the existence of a signature in the header, and forwarding the packet in accordance with the validity of the signature and with whether a router limit has been exceeded. The router limit may be associated with a number of packets per predetermined set of senders in order to limit the size of the group of authorized senders. The router limit also may be associated with a predetermined period of time to limit the rate at which senders transmit packets to the router.

Advantages of the invention will be set forth, in part, in the description that follows and in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments consistent with the present invention and, together with the description, serve to explain the principles of the invention.

FIGS. 2(a) and 2(b) are diagrams of data processing systems in accordance with an embodiment consistent with the present invention.

FIG. 3 is a diagram showing a format of a packet in accordance with an embodiment consistent with the present invention.

FIG. 4 is a diagram of a network in which a public key of an owner is placed in a DNS server.

DETAILED DESCRIPTION OF THE PREFERRED EMBODIMENTS

Reference will now be made in detail to embodiments consistent with the invention, examples of which are illustrated in the accompanying drawings. Wherever possible, the same reference numbers will be used throughout the drawings to refer to the same or like parts.

Figure 1:
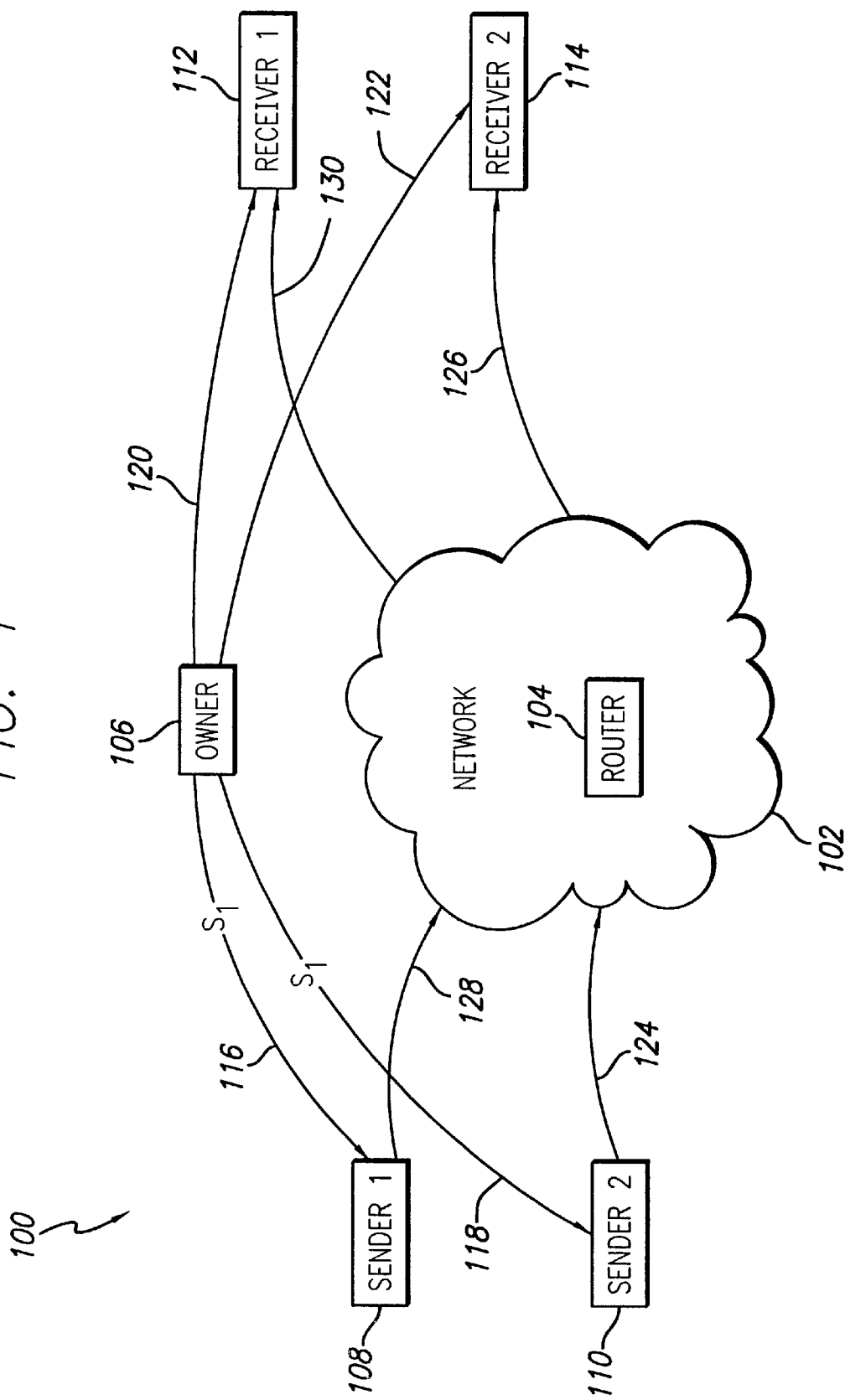
FIG. 1 is a diagram of a network in accordance with an embodiment consistent with the present invention.

FIG. 1 is a diagram 100 of an embodiment consistent with the present invention which shows a network 102 containing a router 104. An owner 106 disseminates private key $S_1$ to senders 108 and 110, as shown by arrows 116 and 118. Owner 106 disseminates the private keys by a known method. Co-pending patent application Ser. No. 08/885,817 entitled, "Techniques for Securing Data Flow in Internet Multicasting", filed on Jun. 30, 1997, of Amit Gupta and Paul Jardetzky which is related to the subject application and is herein incorporated by reference discloses a method of sending private keys to receivers. These private keys are also known as secret keys or signature keys. Owner 106 may store a pair of keys, one for send and one for listen access, or alternatively, the owner may create a table of keys in which the table entries are accessed using an index corresponding to a particular key.

Sender 110 receives its private key $S_1$ from owner 106, as shown by arrow 118. When sender 110 sends a multicast packet, it generates a fingerprint corresponding to data contained in a packet, and then uses the sender's private key to encrypt the fingerprint. The encrypted fingerprint is a unique signature which is used to identify that the sender has authorization to send the packet to the multicast group. The sender includes the fingerprint and signature with the remaining packet contents and then sends the packet.

Router 104 receives the packet from sender 108, 110, as shown by arrows 128, 124, and processes the packet to determine whether to forward the packet. This process is described in further detail below. If a signature is required, exists, and is valid, then router 104 forwards the packet to receiver 112, 114, as shown by arrows 130, 126.

FIG. 2(a) is a block diagram of a data processing system 200 showing an embodiment consistent with the present invention. Data processing system 200 includes router or firewall system 206, input device 208, output device 210, computer readable medium 212, computer readable medium input device 214 and a network connection 237. Router or firewall system 206 includes processor 202 and storage 204 such as a memory.

Storage 204 contains filtering software 218 and public key table 216. Public key table 216 contains one or more public keys of the senders which were generated by owner 106. Three public keys $P_1$, $P_2$, and $P_3$ 217 and their associated indexes 215 are shown in public key table 216. Storage 204 also contains a flag 213 which determines whether this router requires a signature in the multicast packet.

The public keys are obtained from the domain name system (DNS) 412, a certification server (not shown), or any other appropriate key distribution scheme, and are stored in public key table 216. Filtering software 218 uses an appropriate key from public key table 216 to check the validity of the signature contained in the header of an incoming packet. If the signature is valid, then router 206 forwards the packet to receivers 112, 114, as shown by arrows 130, 126. Otherwise, the packet may be discarded. This process is described in further detail below.

A person of ordinary skill in the art will understand that data processing system 200 may also contain additional information, such as input/output lines; input devices, such as a keyboard, a mouse, and a voice input device; and display devices, such as a display terminal. Input device 208 may be a floppy disk drive, CD ROM reader, or DVD reader, that reads computer instructions stored on a computer readable medium, such as a floppy disk, a CD ROM, or a DVD drive. Data processing system 200 also may include application programs, operating systems, data, etc., which are not shown in the figure for the sake of clarity. It also will be understood that data processing system 200 may also include numerous elements not shown, such as disk drives, keyboards, display devices, network connections, additional memory, additional CPUs, LANs, input/output lines, etc.

In the following discussion, it will be understood that the steps of methods and flow charts discussed preferably are performed by an appropriate processor 202 executing instructions stored in storage 204. It will also be understood that the invention is not limited to any particular implementation or programming technique and that the invention may be implemented using any appropriate techniques for implementing the functionality described herein. The invention is not limited to any particular programming language or operating system.

The instructions in storage 204 may be read from computer-readable medium 212. Execution of sequences of instructions contained in storage 204 causes processor 202 to perform the process steps described herein. In alternative embodiments consistent with the present invention, hard-wired circuitry may be used in place of or in combination with software instructions to implement the invention. Thus, embodiments consistent with the present invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution: For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the internet.

Figure 2B:
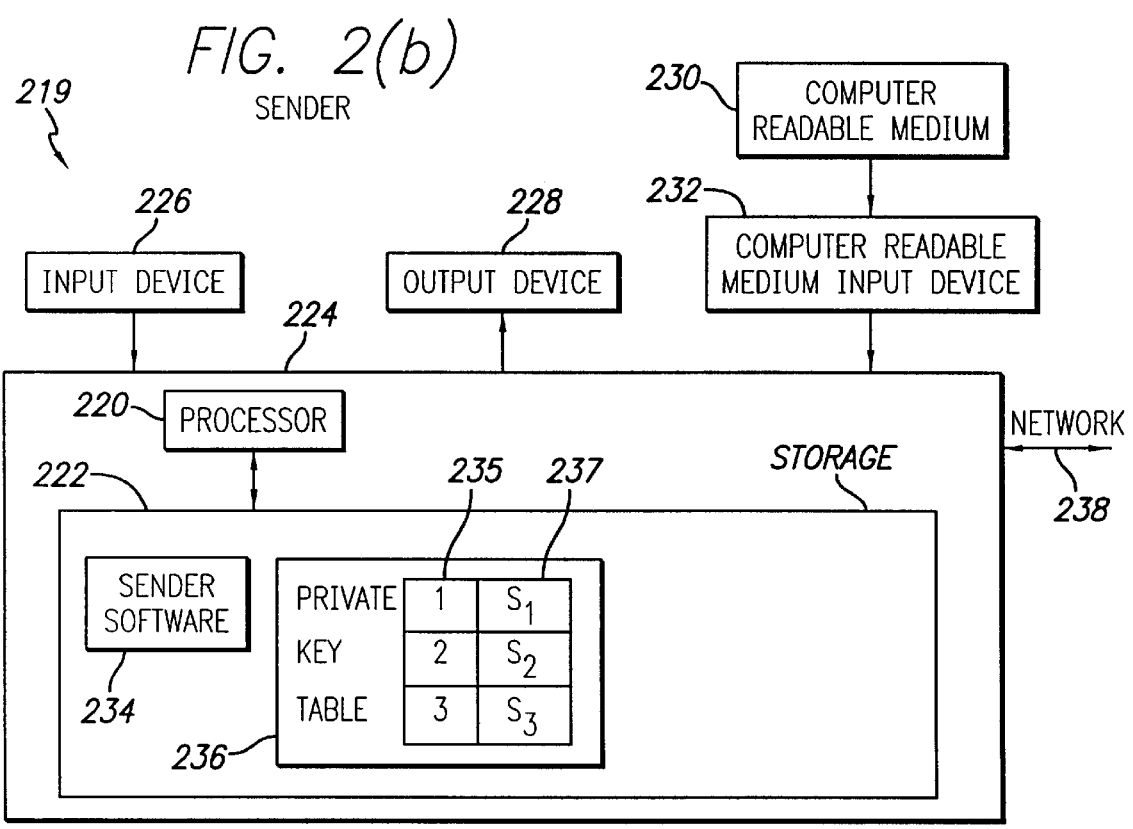

FIG. 2(b) is a block diagram of a data processing system 219 showing an embodiment consistent with the present invention. Data processing system 219 includes sender system 224, input device 226, output device 228, computer readable medium 230, computer readable medium input device 232, and a network connection 238. Sender system 224 includes processor 220 and storage 222, such as a memory. Sender software 234 and private key table 236 containing indexes 235 to private keys $S_1$, $S_2$, and $S_3$ 237 are contained within storage 222.

FIG. 3 is a diagram showing a format of a packet format 300 which contains an IP header 302 and data 304. IP header 302 contains an IP header options field 322, a fingerprint (also called a digest or a message digest) 308, a signature (also called a signed fingerprint or encrypted message digest) 310, and a key index 312.

The key index indicates an entry in a key table where a plurality of keys are stored. If only one key is stored, the use of the key index is optional, for example if $P_1$ was the only key stored in storage 204 in the router. The index is used to retrieve a particular key from the table. In public key table 216, indexes 215 point to public keys 217. For example, key $P_1$, is stored in public key table 216 and is associated with an index having a value of 1. This value is stored in key index 312 in the packet header. Similarly, key $P_2$, is associated with an index having a value of 2, and key $P_3$, is associated with an index having a value of 3.

IP header 302 also includes a source address 314, a source address port 316, a destination address 318, and a destination address port 320. IP header options 322 include a router alert option. The purpose of the router alert option is to alert routers to examine the contents of an IP packet more closely and to provide backward compatibility with other network protocols.

The router alert option format contains a 4-byte field in which two of the bytes contain a two octet code indicating whether the router should examine the packet. If the value of the octet is zero, the packet is examined. If the value of the octet is anything else, the packet is not examined. The IP Router Alert Option is described more fully in Request for Comments (RFC) 2113 written by D. Katz in Feb. 1997, which is herein incorporated by reference to the extent that it is not inconsistent with the present invention. It should be understood that packet format 300 includes other fields not shown in the figure for the sake of clarity.

FIG. 4 shows a network 102 in a system generally designated 400, an owner 106, a router 104, and a DNS server 412. DNS server 412 is a general-purpose distributed data query service used for translating hostnames into IP addresses. DNS server 412 includes a DNS table 408. Owner 106 installs DNS table entry 406 into DNS table 408. Table entry 406 includes both a public key $P_1$ and its associated IP address. Router 104 requests DNS table entry 406 from DNS server 412 in order to retrieve public key $P_1$.

Figure 5:
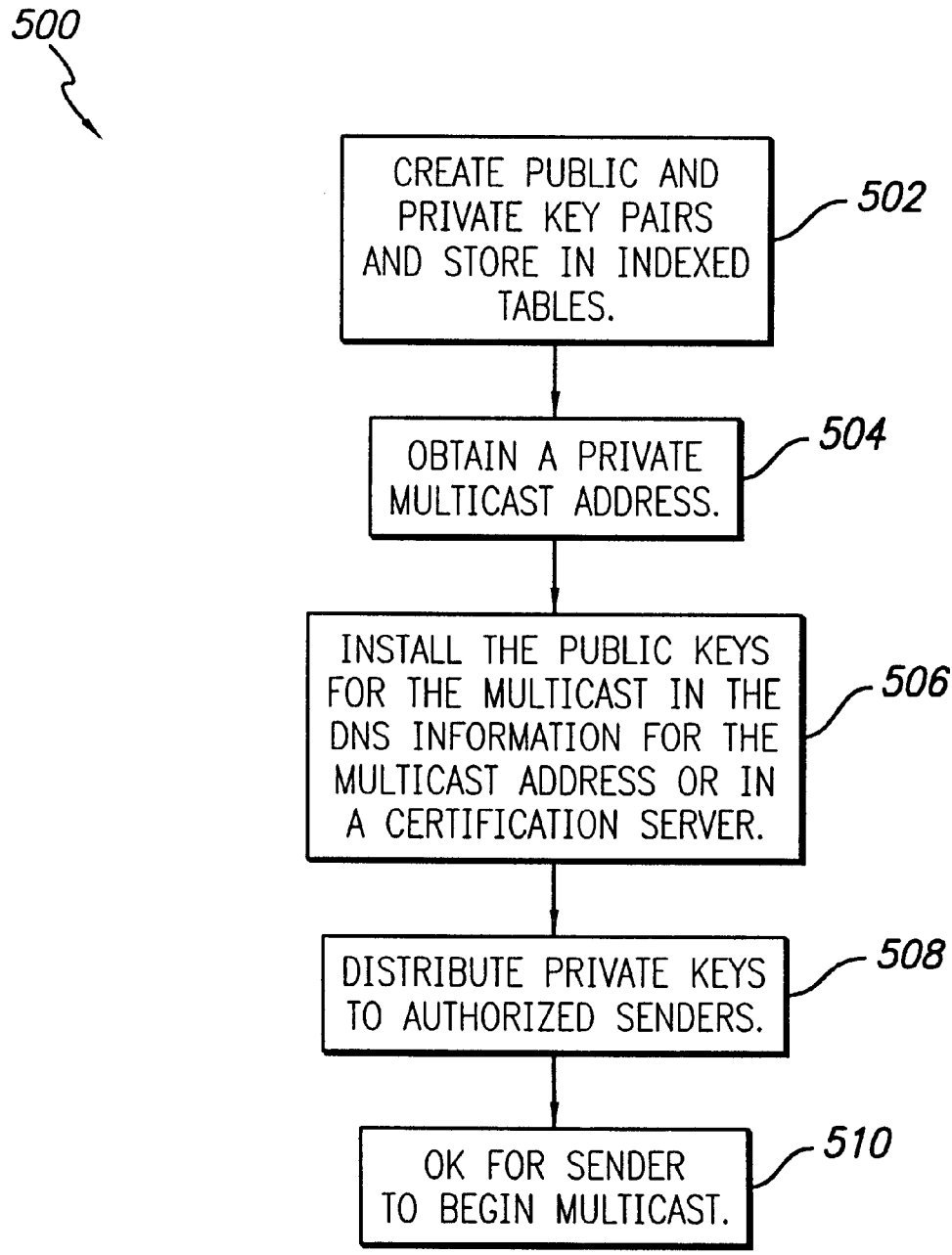
FIG. 5 is a flow chart showing steps performed by an owner in accordance with an embodiment consistent with the present invention to create and distribute keys.

In an embodiment consistent with the present invention, owner 106 creates and distributes public and private keys. An embodiment consistent with this method is shown in FIG. 5 and generally designated 500. In step 502, owner 106 creates several public and private key pairs for a multicast and stores them in indexed tables. In step 504, owner 106 obtains a private multicast address. Next, in step 506, owner 106 installs the public keys for the multicast. Owner 106 may install the public keys in the DNS server 412 or in a certification server. After installing the public keys, owner 106 distributes private (secret) keys to authorized senders, in step 508. Note that owner 106 may change which senders are authorized by sending a replacement key to a new set of authorized senders and by disallowing use of the current key. If there are multiple private keys, an index is associated with each key. As shown in FIG. 2, both public key table 216 (in the DNS server) and private key table 236 (in the sender) can be indexed. At step 510, the sender is ready to begin.

Figure 6:
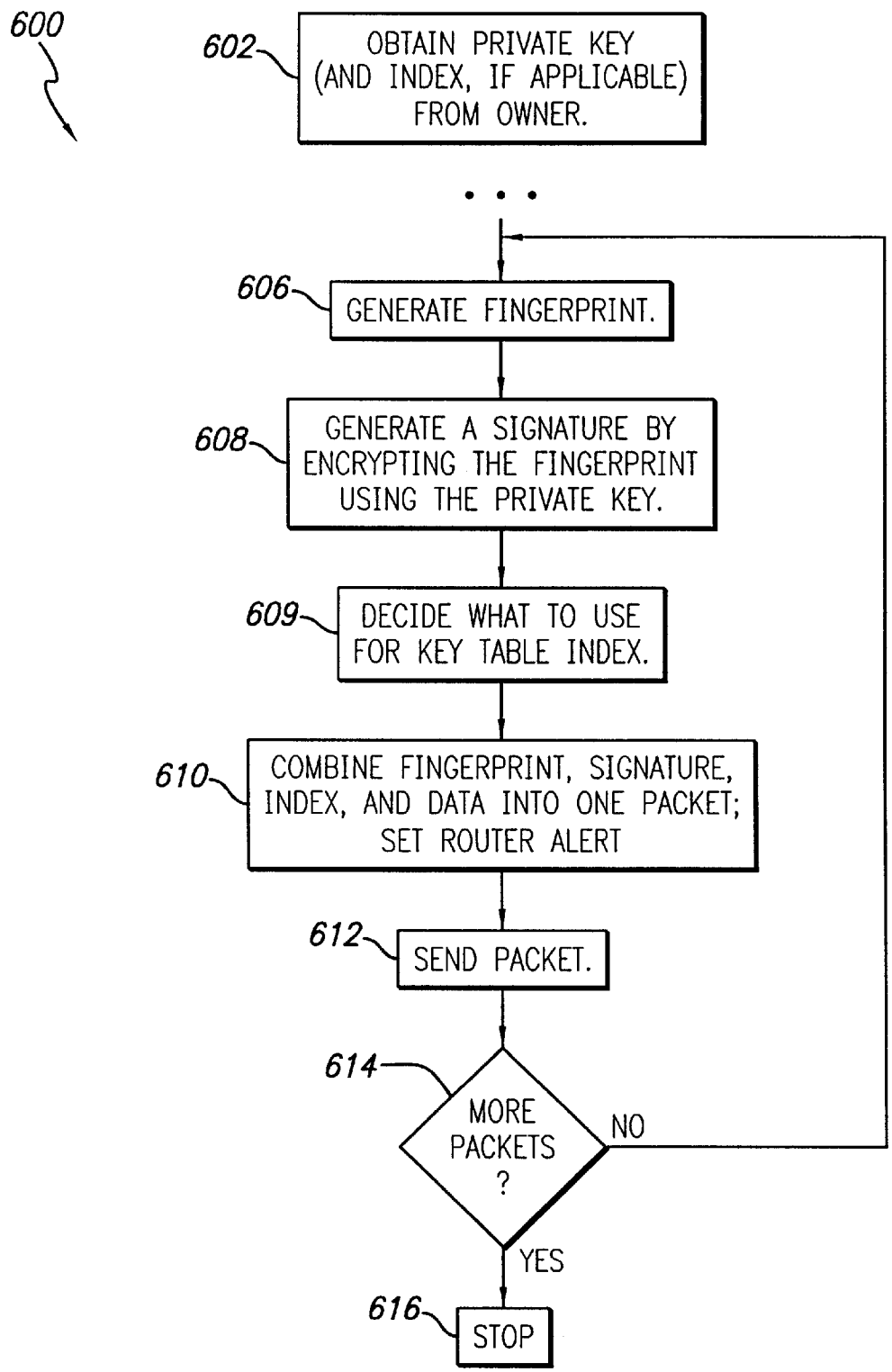
FIG. 6 is a flow chart showing steps performed by a sender in accordance with an embodiment consistent with the present invention to sign packets.

In an embodiment consistent with the present invention, sender 108 signs a packet before sending it. An embodiment consistent with this method is shown in FIG. 6 and generally designated 600. In step 602, sender 108 obtains the private key and key index 312 (assuming there are multiple keys) from owner 106. This step is performed separately at some time before steps 606–616. Steps 606–616 send a signed multicast message. In step 606, sender 208 generates a fingerprint or digest 308 corresponding to data 304 in packet format 300. Methods for generating fingerprint 308 include MD5 and EC2/4 which are described in B. Schneier, *Applied Cryptography*, John Wiley & Sons, Inc., 1996, Chapter 18.5, which is herein incorporated by reference to the extent that it is not inconsistent with the present invention.

Next, in step 608, sender 108 creates signed fingerprint 310 by encrypting fingerprint 308 with the private key. The encryption may be implemented by a number of suitable encryption methods such as RSA, which is described which is in B. Schneier, *Applied Cryptography*, John Wiley & Sons, Inc., 1996, Chapter 19.3, which is herein incorporated by reference to the extent that it is not inconsistent with the present invention. This step is also known as signing the digest. Signed fingerprint 310 may be referred to as the signature. In step 609, sender 108 decides what to use for index 312. After creating signature 310 and deciding on an index, sender 108, in step 610, combines fingerprint 308, signature 310, index 312, and data 304 into one packet. Sender 108 then multicasts the packet in step 612. In step 614, sender 108 checks to find out if it has finished processing packets. If yes, then processing is over, step 616. If not, then sender 108 begins processing the next packet in step 604.

Figure 7:
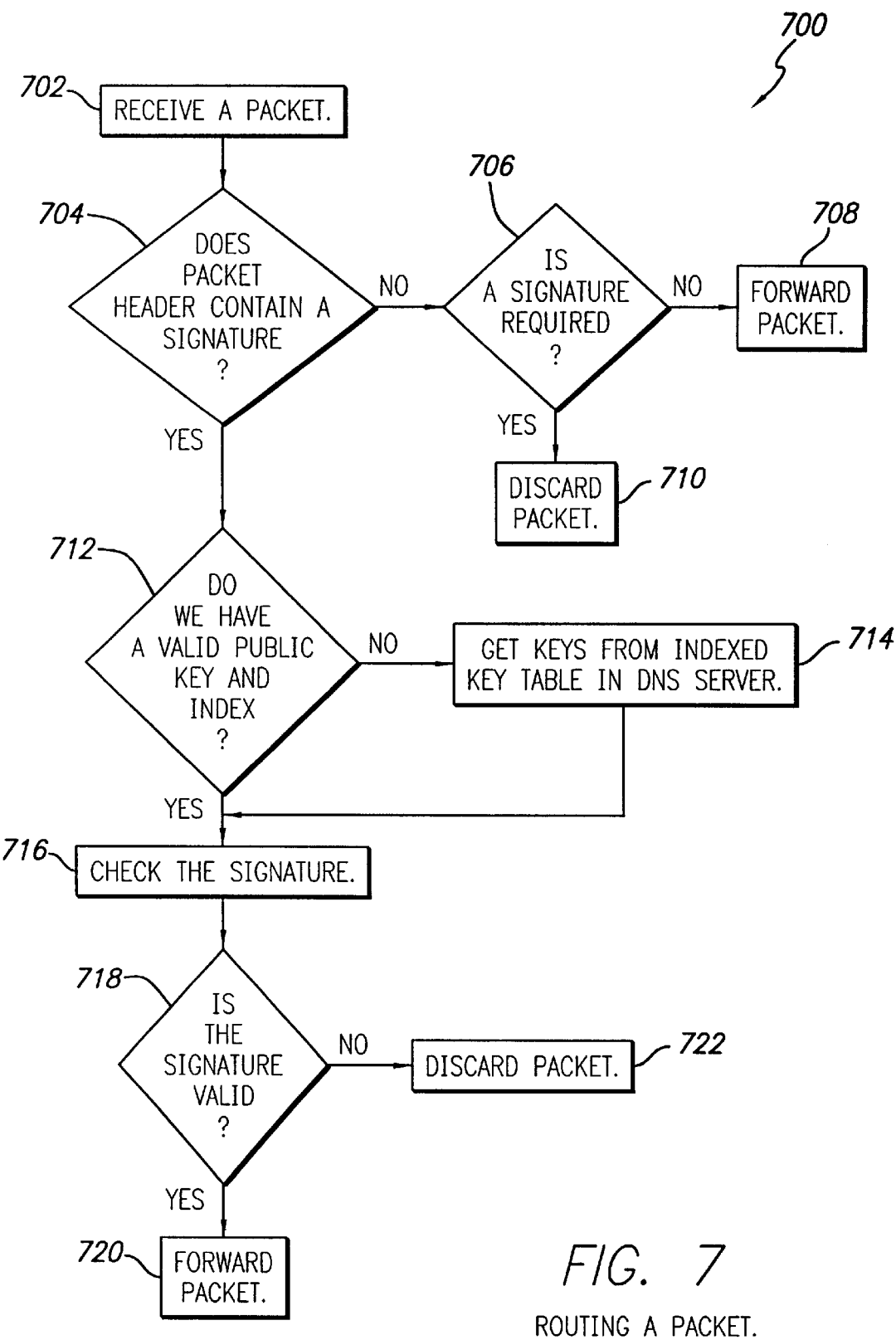
FIG. 7 is a flow chart showing steps performed by a router or a firewall in accordance with an embodiment consistent with the present invention to determine whether to forward packets.

An embodiment consistent with the present invention includes a "logical place" called a "filter point" which filters received packets. The filter point receives a packet including header and data, detects the existence of a signature in the header and forwards the packet in accordance with the validity of the signature. A filter point may be, for example, a router 104 or a firewall of an intranet. An embodiment consistent with this method is shown in the flow chart of FIG. 7 and generally designated 700. In step 702, router 104 receives a packet having format 300. The packet is received from a sender 108, 110.

In step 704, router 104 determines whether packet format 300 contains a signature 310 by inspecting the router alert in IP header options field 322. If no signature 310 exists in packet format 300, router 104 then determines, in step 706, whether a signature is required. If a signature is not required, in step 708, router 104 forwards the packet. However, if a signature is required, and no signature is present, router 104 discards the packet, step 710. Router 104 preferably determines whether a signature is required by checking a flag 213 in storage 204. The flag may be set by any appropriate source.

If a signature 310 exists in packet format 300, router 104 then determines whether it has a valid public key corresponding to a valid key index, if applicable, in step 712. If router 104 does not have the public key, then it gets the public key from the Domain Name Server (DNS) 412, or from a certification server in step 714. Once router 104 has the public key, it uses the public key to check signature 310 in step 716. This checking step is done by decrypting the signature 310 to yield a decrypted fingerprint. If the decrypted fingerprint equals fingerprint 308 in the packet, then the signature is valid. Router 104 then determines whether signature 310 is valid by comparing the decrypted fingerprint and the fingerprint 308. If the two values match, the signature is valid. If signature 310 is valid, router 104 forwards the packet in step 720. If signature 310 is not valid, then router 104 discards the packet, in step 722.

Figure 8:
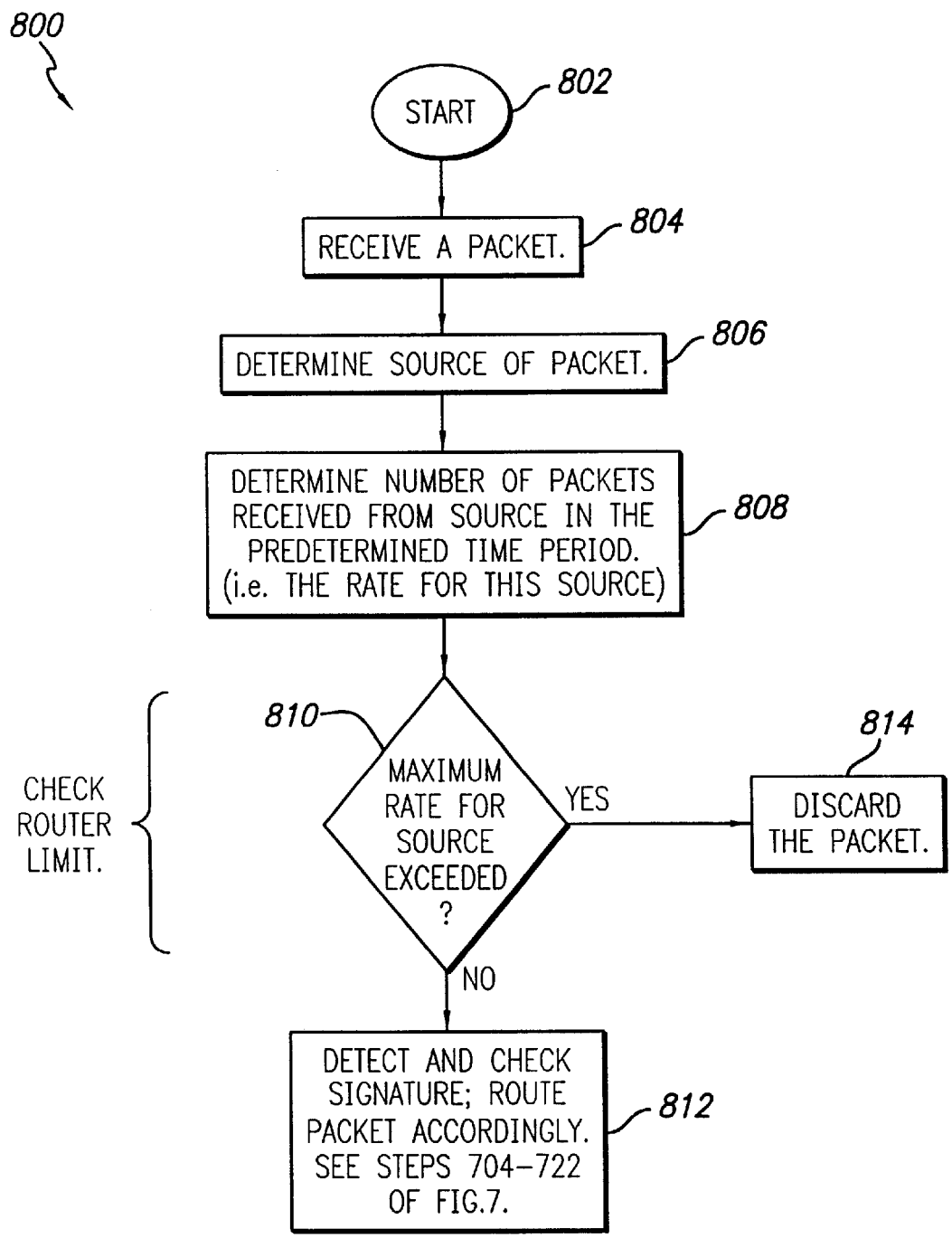
FIG. 8 is a flow chart showing steps performed by a router in accordance with an embodiment consistent with the present invention to filter packets in accordance with a router limit.

An embodiment consistent with the present invention includes a router which filters packets in accordance with a predetermined router limit. An embodiment consistent with this method is shown in the flow chart of FIG. 8 and generally designated 800. At the start of this method, step 802, a predetermined router limit exists. This predetermined limit may be, for example, a rate at which the router may receive packets from a particular source or sender. Such a predetermined rate is useful in preventing denial of service attacks in which an unauthorized sender sends numerous unauthorized packets to the router.

First the router receives a packet, in step 804, and then in step 806, determines the particular source of the received packet. The number of packets received from the source during the predetermined time period, i.e. the rate at which packets from this source are being received is determined in step 808. The router checks the router limit in step 810 by checking whether the maximum rate for the particular source has been exceeded. If the rate limit has been exceeded, the router discards the packet, in step 820. Otherwise, if the rate limit has not been exceeded, the router detects and checks the signature and routes the packet accordingly in step 812. See steps 704–722 of FIG. 7 above for more detail.

Other embodiments consistent with the present invention will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of filtering packets destined for a multicast group, the method comprising:

receiving a packet destined for a multicast group, the packet including a digital signature;

retrieving a key associated with an authorized sender of packets destined for a multicast group;

using the key to decrypt the digital signature;

determining the validity of the digital signature; and forwarding the packet to the multicast group if the digital signature is valid; and wherein the multicast group is a subset of a broadcast group, which broadcast group includes all network nodes; wherein, the filtering is performed by a data processor at a filer point in a network; and wherein, a set of filter points where the filtering is performed forms a subset of the set of all network nodes.

2. The method of claim 1, further comprising disseminating the key to the filter point and to the authorized sender.

3. The method of claim 2, wherein the key is stored in an indexed table.

4. The method of claim 1, wherein forwarding the packet includes the step of discarding the packet if the digital signature is invalid.

5. The method of claim 1, further comprising:

determining a number of packets received from the authorized sender of packets;

determining whether the number of packets exceeds a router limit; and wherein:

forwarding the packet comprises forwarding the packet to the multicast group if the digital signature is valid and if the number of packets received from the authorized sender has not exceeded the router limit.

6. The method of claim 5 wherein the router limit is associated with a number of packets per minute.

7. The method of claim 5 wherein the router limit is associated with a predetermined set of authorized senders.

8. The method of claim 1:

wherein receiving a packet comprises receiving a packet including a key index and a digital signature; and further comprising retrieving a key associated with the key index.

9. The method of claim 8, wherein the key is stored in an indexed table.

10. The method of claim 1, wherein the filter point includes a firewall.

11. An apparatus that filters packets destined for a multicast group, the apparatus comprising:

circuitry configured to receive a packet destined for a multicast group, the packet including a digital signature;

circuitry configured to retrieve a key associated with an authorized sender of packets destined for the multicast group;

circuitry configured to use the key to decrypt the digital signature;

circuitry configured to determine the validity of the digital signature; and circuitry configured to forward the packet to the multicast group if the digital signature is valid; and wherein the multicast group is a subset of a broadcast group, which broadcast group includes all network nodes; wherein, the filtering is performed by a data processor at a filer point in a network; and wherein, a set of filter points where the filtering is performed forms a subset of the set of all network nodes.

12. The apparatus of claim 11, further comprising circuitry configured to disseminate the key to the filter point and to the authorized sender.

13. The apparatus of claim 12, wherein the key is stored in an indexed table.

14. The apparatus of claim 12, wherein the filter point is a firewall.

15. The apparatus of claim 11, wherein the circuitry configured to forward the packet further includes circuitry configured to discard the packet if the digital signature is invalid.

16. The apparatus of claim 11, further including:
   circuitry configured to determine a number of packets received from the authorized sender of packets;
   circuitry configured to determine whether the number of packets exceeds a router limit; and wherein
      the circuitry configured to forward the packet comprises circuitry configured to forward the packet to the multicast group if the digital signature is valid and if the number of packets from the authorized sender does not exceed the router limit.

17. The apparatus of claim 16 wherein the router limit is associated with a number of packets per minute.

18. The apparatus of claim 16 wherein the router limit is associated with a predetermined set of authorized senders.

19. The apparatus of claim 11:
   wherein the circuitry configured to receive a packet comprises circuitry configured to receive a packet including a key index and a digital signature; and
   further comprising circuitry configured to retrieve a key associated with the key index.

20. The apparatus of claim 19, wherein the key is stored in an indexed table.

21. An apparatus for filtering packets destined for a multicast group, the method comprising:
   means for receiving a packet destined for a multicast group, the packet including a digital signature;
   means for retrieving a key associated with an authorized sender of packets destined for the multicast group;
   means for using the key to decrypt the digital signature;
   means for determining the validity of the digital signature; and
   means for forwarding the packet to the multicast group if the digital signature is valid; and
   wherein the multicast group is a subset of a broadcast group, which broadcast group includes all network nodes; wherein, the filtering is performed by a data processor at a filer point in a network; and wherein, a set of filter points where the filtering is performed forms a subset of the set of all network nodes.

22. A computer program product, comprising: a computer usable medium having computer readable code embodied therein for filtering packets destined for a multicast group, the computer program product including:
   computer readable program code devices configured to cause a computer to receive a packet destined for a multicast group, the packet including a digital signature;
   computer readable program code devices configured to cause a computer to retrieve a key associated with an authorized sender of packets destined for the multicast group;
   computer readable program code devices configured to cause a computer to use the key to decrypt the digital signature;
   computer readable program code devices configured to cause a computer to determine the validity of the digital signature; and
   computer readable program code devices configured to cause a computer to forward the packet to the multicast group if the digital signature is valid; and
   wherein the multicast group is a subset of a broadcast group, which broadcast group includes all network nodes; wherein, the filtering is performed by a data processor at a filer point in a network; and wherein, a set of filter points where the filtering is performed forms a subset of the set of all network nodes.

23. The computer program product of claim 22, further comprising computer readable program code devices configured to disseminate the key to the filter point and to the authorized sender.

24. The computer program product of claim 23, wherein the key is stored in an indexed table.

25. The computer program product of claim 23, wherein the filter point is a firewall.

26. The computer program product of claim 22, wherein the computer readable program code devices configured to forward the packet further include computer readable program code devices configured to discard the packet if the digital signature is invalid.

27. The computer program product of claim 22, further comprising:
   computer readable program code devices configured to determine a number of packets received from the authorized sender of packets;
   computer readable program code devices configured to determine whether the number of packets exceeds a router limit;
   and wherein:
      the computer readable program code devices configured to forward the packet comprise computer readable program code devices configured to forward the packet to the multicast group if the digital signature is valid and if the number of packets received from the authorized sender has not exceeded the router limit.

28. The computer program product of claim 27 wherein the router limit is associated with a number of packets per minute.

29. The computer program product of claim 27 wherein the router limit is associated with a predetermined set of authorized senders.

30. The computer program product of claim 22:
   wherein the computer readable program code devices configured to cause a computer to receive a packet comprise computer readable program code devices configured to cause a computer to receive a packet including a key index and a digital signature; and
   further comprising computer readable program code devices configured to retrieve a key associated with the key index.

31. The computer program product of claim 30, wherein the key is stored in an indexed table.

32. A computer data signal embodied in a carrier wave and representing sequences of instructions which, when executed by a processor cause said processor to filter packets destined for a multicast group by:
   executing a computer program to receive a packet destined for a multicast group, the packet including a digital signature;
   executing the computer program to retrieve a key associated with an authorized sender of packets destined for the multicast group;
   executing the computer program to use a key to decrypt the digital signature;
   executing the computer program to determine the validity of the digital signature; and executing the computer program to forward the packet to the multicast group if the digital signature is valid; and wherein the multicast group is a subset of a broadcast group, which broadcast group includes all network nodes; wherein, the filtering is performed by a data processor at a filer point in a network; and wherein, a set of filter points where the filtering is performed forms a subset of the set of all network nodes.

33. The method of claim 32, further comprising executing the computer program to disseminate the key to the filter point and to the authorized sender.

34. The method of claim 33, wherein the key is stored in an indexed table.

35. The method of claim 33, wherein the filter point is a firewall.

36. The method of claim 32, wherein executing the computer program to forward the packet includes executing the computer program to discard the packet if the digital signature is invalid.

37. A method of claim 32, further comprising:

executing the computer program to determine a number of packets received from the sender of packets; and executing the computer program to determine whether the number of packets exceeds a router limit;

and wherein:

executing the computer program to forward the packet comprises executing the computer program to forward the packet to the multicast group if the digital signature is valid and if the number of packets received from the authorized sender has not exceeded the router limit.

38. The method of claim 37 wherein the router limit is associated with a number of packets per minute.

39. The method of claim 37 wherein the router limit is associated with a predetermined set of authorized senders.

40. The method of claim 32:

wherein executing the computer program to receive a packet comprises executing the computer program to receive a packet including a key index and a digital signature; and further comprising executing the computer program to retrieve a key associated with the key index.

41. The method of claim 40, wherein the key is stored in an indexed table.

* * * * *